United States Patent
Eustice et al.

(10) Patent No.: US 9,183,535 B2
(45) Date of Patent: Nov. 10, 2015

(54) SOCIAL NETWORK MODEL FOR SEMANTIC PROCESSING

(75) Inventors: Kevin Francis Eustice, Seattle, WA (US); Nolan Lawson, Lynwood, WA (US); Meliha Yetisgen-Yildiz, Kenmore, WA (US); Kenji Kawai, Seattle, WA (US); Michael Perkowitz, Seattle, WA (US); Patrick James Ferrel, Seattle, WA (US); Jonathan D. Lazarus, Mercer Island, WA (US)

(73) Assignee: ARO, Inc., Seattle, WA (US)

( * ) Notice: Subject to any disclaimer, the term of this patent is extended or adjusted under 35 U.S.C. 154(b) by 484 days.

(21) Appl. No.: 12/512,752

(22) Filed: Jul. 30, 2009

(65) Prior Publication Data

US 2010/0030715 A1 Feb. 4, 2010

Related U.S. Application Data

(60) Provisional application No. 61/137,620, filed on Jul. 30, 2008, provisional application No. 61/142,875, filed on Jan. 6, 2009.

(51) Int. Cl.
*G06F 15/18* (2006.01)
*G06F 17/30* (2006.01)
*G06N 5/02* (2006.01)
*G06Q 10/10* (2012.01)

(52) U.S. Cl.
CPC . *G06Q 10/10* (2013.01); *G06N 5/02* (2013.01)

(58) Field of Classification Search
None
See application file for complete search history.

(56) References Cited

U.S. PATENT DOCUMENTS

| | | |
|---|---|---|
| 5,345,551 A | 9/1994 | Shelley et al. |
| 6,366,922 B1 | 4/2002 | Althoff |
| 6,370,554 B1 | 4/2002 | Sun-Woo |
| 6,816,863 B2 | 11/2004 | Bates et al. |
| 6,985,926 B1 | 1/2006 | Ferlauto et al. |
| 7,069,228 B1 | 6/2006 | Rose et al. |
| 7,249,123 B2 * | 7/2007 | Elder et al. ............... 1/1 |
| 7,428,579 B2 | 9/2008 | Libbey et al. |
| 7,525,484 B2 | 4/2009 | Dupray et al. |
| 7,565,403 B2 | 7/2009 | Horvitz et al. |
| 7,634,528 B2 | 12/2009 | Horvitz et al. |
| 7,636,733 B1 | 12/2009 | Rothmuller |

(Continued)

OTHER PUBLICATIONS

Hirsch, "An Index to Quantify and Individual's Scientific Research Output", Proceedings of the National Academy of Sciences of the United States of America, vol. 102 No. 46, Nov. 2005, pp. 16569-16572.*

(Continued)

*Primary Examiner* — Kakali Chaki
*Assistant Examiner* — Walter Hanchak
(74) *Attorney, Agent, or Firm* — Fenwick & West LLP (57) ABSTRACT

A social network model, based on data relevant to a user, is used for semantic processing to enable improved entity recognition among text accessed by the user. An entity extraction module of the server, with reference to a general training corpus, general gazetteers, user-specific gazetteers, and entity models, parses text to identify entities. The entities may be, for example, people, organizations, or locations. A social network module of the server builds the social network model implicit in the data accessed by the user. The social network model includes the relationships between entities and an indication of the strength of each relationship. The social network module is also used to disambiguate names and unify entities based on the social network model.

31 Claims, 6 Drawing Sheets

(56) References Cited

U.S. PATENT DOCUMENTS

| | | | |
|---|---|---|---|
| 7,689,448 | B2 | 3/2010 | Fu et al. |
| 7,693,827 | B2 | 4/2010 | Zamir et al. |
| 7,721,229 | B2 | 5/2010 | Frankel et al. |
| 7,885,948 | B2 | 2/2011 | Johnson et al. |
| 7,890,596 | B2 | 2/2011 | Guy |
| 8,108,778 | B2 | 1/2012 | Athsani et al. |
| 8,200,676 | B2 | 6/2012 | Frank |
| 8,594,702 | B2 | 11/2013 | Naaman et al. |
| 8,694,540 | B1 | 4/2014 | Lin et al. |
| 2003/0140088 | A1 | 7/2003 | Robinson et al. |
| 2003/0193481 | A1 | 10/2003 | Sokolsky |
| 2005/0057584 | A1 | 3/2005 | Gruen et al. |
| 2005/0261011 | A1 | 11/2005 | Scott |
| 2005/0267944 | A1 | 12/2005 | Little |
| 2006/0068812 | A1 | 3/2006 | Carro et al. |
| 2006/0112146 | A1* | 5/2006 | Song et al. ............. 707/200 |
| 2006/0121912 | A1 | 6/2006 | Borjesson |
| 2006/0149710 | A1 | 7/2006 | Koningstein et al. |
| 2006/0173957 | A1* | 8/2006 | Robinson et al. ......... 709/204 |
| 2006/0173961 | A1 | 8/2006 | Turski et al. |
| 2006/0184617 | A1 | 8/2006 | Nicholas et al. |
| 2006/0195533 | A1 | 8/2006 | Isozaki et al. |
| 2006/0235873 | A1* | 10/2006 | Thomas ............. 707/102 |
| 2006/0293943 | A1 | 12/2006 | Tischhauser et al. |
| 2006/0294134 | A1 | 12/2006 | Berkhim et al. |
| 2007/0005654 | A1* | 1/2007 | Schachar et al. ......... 707/104.1 |
| 2007/0011236 | A1 | 1/2007 | Ravula |
| 2007/0067272 | A1 | 3/2007 | Flynt et al. |
| 2007/0214180 | A1* | 9/2007 | Crawford ............. 707/104.1 |
| 2007/0271272 | A1* | 11/2007 | McGuire et al. ............. 707/9 |
| 2008/0005249 | A1 | 1/2008 | Hart |
| 2008/0012960 | A1 | 1/2008 | Uchiyama |
| 2008/0059576 | A1 | 3/2008 | Liu et al. |
| 2008/0098331 | A1 | 4/2008 | Novick et al. |
| 2008/0104005 | A1 | 5/2008 | Dalton |
| 2008/0109751 | A1 | 5/2008 | Fitzmaurice et al. |
| 2008/0134088 | A1 | 6/2008 | Tse et al. |
| 2008/0141145 | A1 | 6/2008 | Klausmeier |
| 2008/0167938 | A1 | 7/2008 | Meisels et al. |
| 2008/0228947 | A1* | 9/2008 | Markus et al. ............. 709/249 |
| 2008/0301567 | A1 | 12/2008 | Martin et al. |
| 2009/0006994 | A1 | 1/2009 | Forstall et al. |
| 2009/0037813 | A1 | 2/2009 | Newman et al. |
| 2009/0037822 | A1 | 2/2009 | Kandekar et al. |
| 2009/0055355 | A1* | 2/2009 | Brunner et al. ............. 707/3 |
| 2009/0077056 | A1 | 3/2009 | Ravikumar et al. |
| 2009/0094021 | A1* | 4/2009 | Marvit et al. ............. 704/9 |
| 2009/0099901 | A1 | 4/2009 | Sah et al. |
| 2009/0112525 | A1 | 4/2009 | Adani |
| 2009/0171937 | A1* | 7/2009 | Chen et al. ............. 707/5 |
| 2009/0187537 | A1* | 7/2009 | Yachin et al. ............. 707/3 |
| 2009/0281718 | A1 | 11/2009 | Gibran et al. |
| 2009/0327271 | A1 | 12/2009 | Amitay et al. |
| 2009/0327307 | A1 | 12/2009 | Sun et al. |
| 2010/0050101 | A1 | 2/2010 | Baik et al. |
| 2010/0070297 | A1 | 3/2010 | Tavakol et al. |
| 2010/0070894 | A1 | 3/2010 | Krishnamurthy et al. |
| 2010/0074560 | A1 | 3/2010 | Wagner et al. |
| 2010/0082624 | A1 | 4/2010 | Martin et al. |
| 2010/0131443 | A1 | 5/2010 | Agarwal et al. |
| 2010/0162105 | A1 | 6/2010 | Beebe et al. |
| 2011/0137929 | A1 | 6/2011 | Lehmann et al. |
| 2012/0078884 | A1 | 3/2012 | Callari et al. |
| 2012/0278341 | A1 | 11/2012 | Ogilvy et al. |

OTHER PUBLICATIONS

Lehmann, Jackson, Lautrup, "A Quantitiative Analysis of Indicators of Scientific Performance", Scientometrics, vol. 76, No. 2, 2008, pp. 369-390.*

Rijnsoever, Hessels, Vandeberg, "A Resource-baed View on the Interactions of University Researchers", Research Policy vol. 37, Issue 8, Sep. 2008,pp. 1255-1266.*

Boyd, Danah, "Faceted ID/Entity: Manaaging Representation in a Digital World", Master of Science Thesis for Master of Science in Media Arts and Sciences at the Massachusetts Institute of Technology, 2002 pp. 1-118.*

Aleman-Meza, Nagarajan, Ramakrishnan, Ding, Kolari, Sheth, Arpinar, Joshi, Finin, "Semantic Analytics on Social Networks: Experiences in Addressing the Problem of Conflict of Interest Detection", Proceeding WWW '06 Proceedings of the 15th international conference on World Wide Web, 2006, pp. 407-416.*

Viegas, Boyd, Nguyen, Potter, Donath, "Digital Artifacts for Remembering and Storytelling: Post History and Social Network Fragments", System Sciences, 2004. Proceedings of the 37th Annual Hawaii International Conference on, Jan. 5-8, 2004, pp. 1-10.*

Jie Tang, Duo Zhang, and Limin Yao, "Social Network Extraction of Academic Reseearchers", ICDM '07 Proceedings of the 2007 Seventh IEEE International Conference on Data Mining, 2007, pp. 292-301.*

Peter A. Gloor, Yan Zhao, "Analyzing Actors and Their Discussion Topics by Semantic Social Network Analysis", Proceedings of the Information Visualization (IV'06), 2003, pp. 1-6.*

Information Technology Services, College of Architecture, Texas A&M University, "How to Schedule Rooms in Microsoft Entourage," 2009 [Online] [Retrieved Jul. 29, 2010] Retrieved from the Internet ,<URL: http://its.arch.tamu.edu/content/support/documentation/mail/entourage/entourage-room-scheduling>.

Microsoft Corporation, "Work with Time Zones in Outlook," 2010 [Online] [Retrieved on Jul. 29, 2010] Retrieved from the Internet , <URL:http://office.microsoft.com/en-us/outlook-help/work-with-time-zones-in-outlook-HA001056530.aspx.>.

PCT International Search Report and Written Opinion, PCT Application No. PCT/US2010/020134, May 19, 2010, 7 pages.

PCT International Search Report and Written Opinion, PCT Application No. PCT/US2009/052313, Sep. 3, 2009, 7 pages.

PCT International Search Report and Written Opinion, PCT Application No. PCT/US2009/052311, Sep. 15, 2009, 6 pages.

United States Patent and Trademark Office, Non-Final Rejection, U.S. Appl. No. 12/904,957, Nov. 8, 2012, 13 Pages.

United States Patent and Trademark Office, Final Rejection, U.S. Appl. No. 12/624,682, Aug. 31, 2012, 19 Pages.

United States Patent and Trademark Office, Final Rejection, U.S. Appl. No. 12/624,693, Aug. 2, 2012, 12 Pages.

United States Office Action, U.S. Appl. No. 12/624,682, Aug. 29, 2013, fifteen pages.

United States Office Action, U.S. Appl. No. 12/624,693, Aug. 30, 2013, nine pages.

United States Office Action, U.S. Appl. No. 12/568,354, Nov. 7, 2013, nineteen pages.

United States Office Action, U.S. Appl. No. 12/624,682, Apr. 24, 2014, seventeen pages.

United States Office Action, U.S. Appl. No. 12/624,682, Mar. 27, 2015, seventeen pages.

* cited by examiner

SOCIAL NETWORK MODEL FOR SEMANTIC PROCESSING

CROSS-REFERENCE TO RELATED APPLICATION

This application claims the benefit of U.S. Provisional Patent Application No. 61/137,620, filed Jul. 30, 2008, and U.S. Provisional Patent Application No. 61/142,875, filed Jan. 6, 2009, which are hereby incorporated by reference in their entirety. This application is related to U.S. patent application Ser. No. 12/512,854, filed Jul. 30, 2009, entitled "Data-Oriented User Interface for Mobile Device," which is incorporated by reference in its entirety.

BACKGROUND

1. Field of the Invention

The present invention relates to information extraction and to semantic processing of data on a computing device.

2. Description of the Related Art

Data can inherently be useful in a variety of applications across different contexts. However, most data stored on or accessed by mobile devices is organized according to the context presented on a screen within a single application, and it is cumbersome to interact with the data outside of the context in which it appears. One technique for organizing and indexing data to make it more accessible involves data objects referred to as "entities." Entities may be people, organizations, or locations, for example. Entities have properties and metadata associated with them, such as aliases, points of contact for the entity, and the like. Entity recognition or extraction is the task of recognizing an entity when it is referred to within data that is analyzed as part of semantic processing. When entity recognition is accurate, it enables the document or file containing the entity to be indexed according to the entities recognized within the document or file. Thus, the data relevant to the entity can be quickly retrieved.

SUMMARY

Embodiments of the invention provide a social network model based on data relevant to a user that can be used for semantic processing to enable improved entity recognition among text accessed by a user on a device. In one embodiment, an entity extraction module of the server, with reference to a general training corpus, general gazetteers, user-specific gazetteers, and entity models, parses text to identify entities. The entities may be, for example, people, organizations, or locations. A social network module of the server builds the social network model implicit in the data accessed on and communicated to and from a user device. The social network model includes the relationships between entities and an indication of the strength of each relationship, based in part, for example, on the frequency with which the relationship is found among other documents and correspondence. The social network module is also used to disambiguate names and unify entities based on the social network model. In other embodiments, methods, systems, and computer-readable media for building a social network model and of identifying an entity from an ambiguous reference using a social network model are also disclosed.

One skilled in the art will readily recognize from the following discussion that alternative embodiments of the structures and methods illustrated herein may be employed without departing from the principles of the invention described herein.

DETAILED DESCRIPTION OF THE EMBODIMENTS

Figure 1:
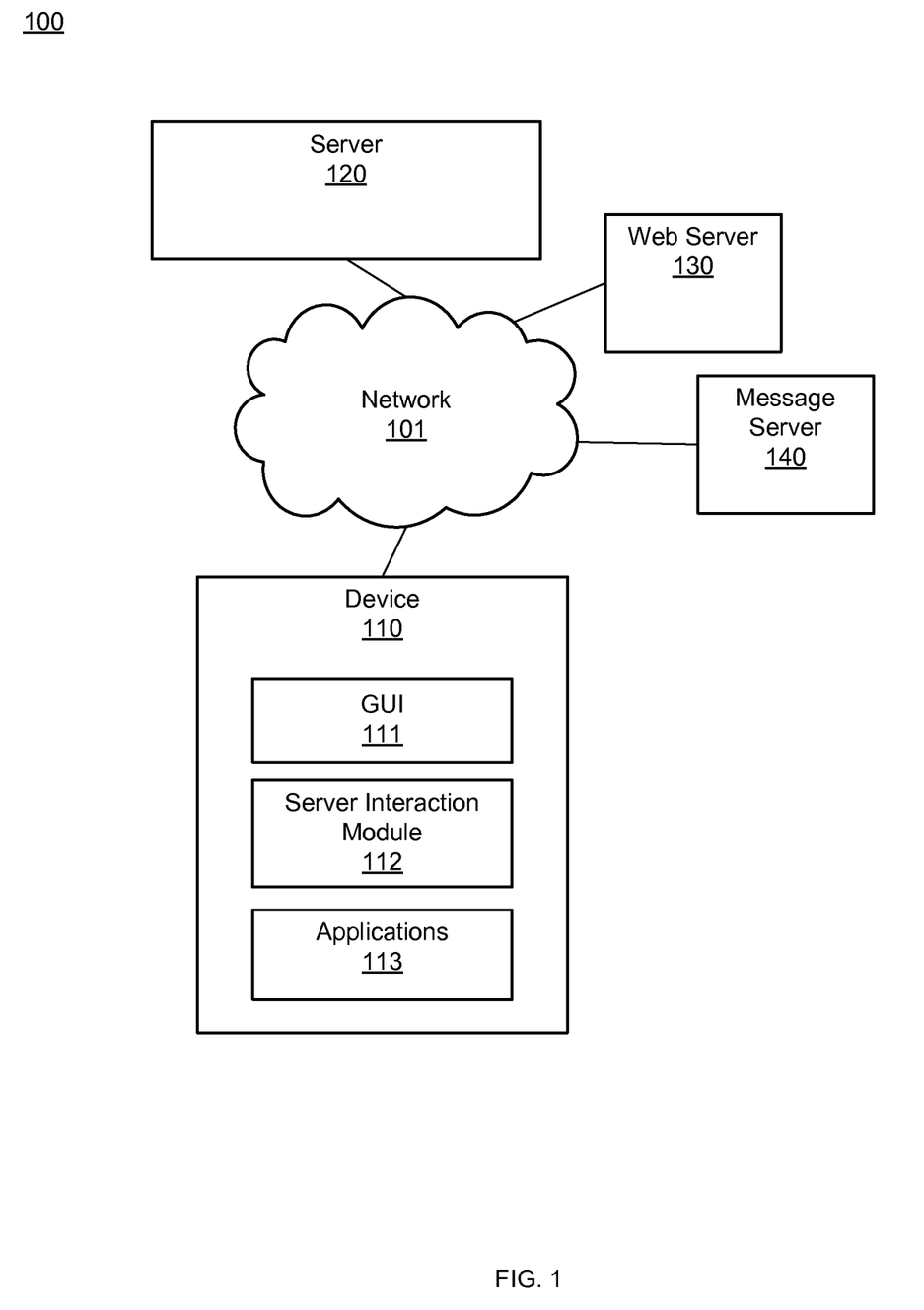
FIG. 1 is a high-level block diagram of the computing environment, in accordance with an embodiment of the invention.

FIG. 1 is a high-level block diagram of the computing environment 100 in accordance with an embodiment of the invention. The computing environment 100 includes a server 120 that is connected via a network 101 to a user device 110. The network 101 is a communications network such as a local area network, a wide area network, a wireless network, an intranet, or the Internet. In one embodiment, the computing environment 100 also includes a web server 130 that serves web pages to the user device 110 and a message server 140 that serves messages such as email or SMS messages to the user device 110. Although only one user device 110 and a limited number of servers are shown in FIG. 1 for clarity, any number and type of user devices and server configurations may be connected to the network 101.

In one embodiment, data flowing to and from the user device 110 passes through the server 120. For ease of reference, the term "document" will be also be used herein to refer to a discrete collection of data, such as a file, an email, a web page, a message, an appointment request, or any other type of electronic document. The server 120 analyzes the documents flowing to and from the user device 110 in order to extract entities from the data. Entities are data objects that represent people, organizations, locations, or other real world items. Entities have properties associated with them, such as aliases, points of contact for the entity, and the like. The server 120 extracts the entities from the documents and passes the entity information to the user device 110 so that the user device 110 can offer to the user contextually-relevant actions with respect to the entities. The server 120 also identifies relationships between the extracted entities based on the documents flowing to and from the user device 110. The server 120 uses the identified relationships between the entities to build a social network model for the user. The social network model is a description of the relationships between the entities that are found in the user's data. The social network model also includes an indication of the strength of the relationships between entities. The server uses the user's social network model, for example, to aid in entity extraction and to aid in identifying entities from an ambiguous reference in the user's data.

In various embodiments, the user device 110 may be any device capable of communicating over the network 101. Examples of a user device 110 include a personal digital assistant (PDA), a mobile phone such as a smart phone, a laptop, a desktop computer, and a computer with limited external user interfaces (such as a television set-top box or in-store computer kiosk). In one embodiment, the user device 110 is a mobile device that offers broad functionality. For example, the mobile device may send and receive SMS messages and email, offer web access, provide GPS functionality, manage contact information, track calendar appointments, and manage and communicate other types of documents.

The user device 110 has a graphical user interface 111 that allows a user to access and interact with data stored on the user device to make use of the device's functionality. The graphical user interface 111 allows users to view information and select information, for example, by clicking on it, touching it, highlighting it with a cursor, or any other method of selecting a portion of the displayed information. In one embodiment, the graphical user interface 111 includes node menus that contain actions relevant to a selected entity and/or spinners which allow a user to simultaneously view information from a variety of applications that is relevant to an entity, both of which have been described in U.S. patent application Ser. No. 12/512,854, filed Jul. 30, 2009, entitled "Data-Oriented User Interface for Mobile Device," which has been incorporated by reference in its entirety.

In this example, in addition to the graphical user interface 111, the user device 110 includes various applications 113 that support the functionality of the user device 110. For example, the user device 110 may include telephone, email, calendar, contact manager, browser, GPS, word processing, spreadsheet, and/or other business or personal applications. Users of the user device 110 may create, receive, send, access, store, or otherwise interact with data through the applications 113.

The user device 110 also includes a server interaction module 112 to manage the communications between the server 120 and the user device 110. Specifically, the server interaction module 112 receives data sent to the user device 110 from the server 120, including, in one embodiment, metadata identifying extracted entities within the data. The server interaction module 112 also receives data to be sent to the server 120 from the user device 110, for example outbound email and text messages.

Figure 2A:
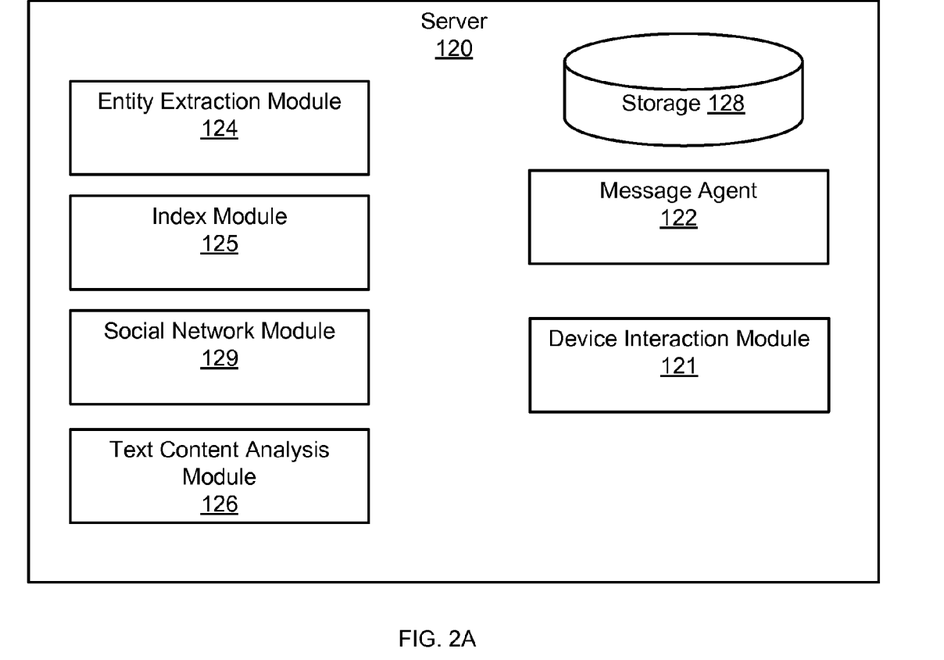
FIG. 2A is a block diagram of a server, in accordance with an embodiment of the invention.

FIG. 2A is a block diagram of a server 120, in accordance with an embodiment of the invention. As mentioned above, the server 120 analyzes data flowing to and from the user device 110 in order to extract entities and identify relationships between entities from the user's data. The server 120 uses the extracted entities and identified relationships to generate a social network model for the user. In this example, the server 120 includes an entity extraction module 124, an index module 125, a text content analysis module 126, a message agent 122, a device interaction module 121, a local storage 128, and a social network module 129.

The entity extraction module 124 identifies entities from data flowing to and from the user device 110. The entity extraction module 124 parses text in a document in order to identify entities. The entity extraction module 124 will be described in greater detail with reference to FIG. 2B.

The index module 125 indexes the data according to the entities extracted by the entity extraction module 124, in one embodiment. In cases where a document contains more than one extracted entity, the document may be indexed under each extracted entity. The index module 125 may store the results of the indexing in a local storage 128 or remote storage (not shown).

The text content analysis module 126 analyzes text from data flowing to or from the user device 110. The text content analysis module 126 compiles statistics related to word usage in each document. In one embodiment, the text content analysis module 126 creates a vector from the content of the document based on the words used therein. This enables a text similarity comparison between any two documents or between a composite of multiple documents referring to a particular entity and a new document to be analyzed. A text similarity comparison is discussed below with reference to FIG. 5.

The message agent 122 receives inbound messages from message server 140 and outbound messages from the user device 110. The message agent 122 may also act as a mail transfer agent in routing messages between servers and mail clients. The message agent 122 provides the server 120 with the ability to intercept and process messages passing between devices on the network 101.

The device interaction module 121 manages the communications between the server 120 and the user device 110. Specifically, the device interaction module 121 receives documents from, for example, web server 130, or message server 140 through message agent 122, or from other locations on the network 101, to be sent to a user device 110. In one embodiment, the device interaction module 121 also receives metadata identifying entities within documents from the entity extraction module 124. The device interaction module 121 also receives data from the user device 110 for subsequent processing by the server 120.

Figure 2B:
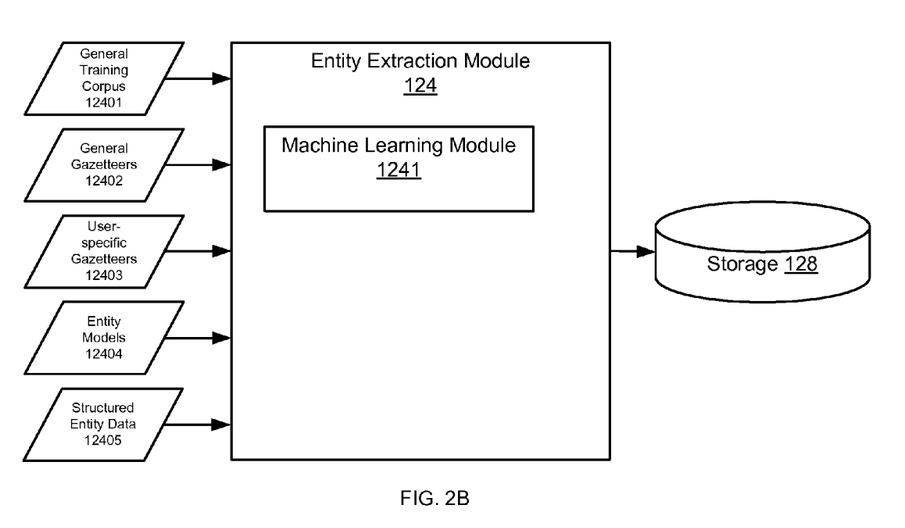
FIG. 2B is a block diagram of an entity extraction module, in accordance with one embodiment of the invention.

FIG. 2B illustrates an entity extraction module 124, in accordance with one embodiment of the invention. The entity extraction module 124 includes a machine learning module 1241 that performs the semantic processing of text. Various techniques may be used by the machine learning module 1241 to extract entities. For example, location names, names of people, and names of organizations are extracted based on full natural language processing, whereas phone numbers, email addresses, and URLs are extracted based on regular expressions, and dates and times are extracted based on a set of rules. In one specific example, the machine learning module 1241 makes use of software libraries from the MinorThird toolkit available from Carnegie Mellon University.

In one embodiment, the entity extraction module 124 can identify an entity name, the type of entity, and a confidence level from any analyzed text. The entity name is an alphanumeric string in one or more parts that is used to refer to the entity. In one embodiment, the entity name may be an alias of the word or words that appear in the text that undergoes analysis by the entity extraction module 124. In one embodiment, the entity type is one of person, organization, location, or other. The confidence level is a measurement of the degree of certainty that the entity identified by the entity extraction module 124 is the entity intended to be referred to by the drafter of the text that was analyzed. For example, an email message may refer to a "Mike S." The receiver may know a "Mike Smith" who is a person. The entity extraction module 124 may identify "Mike Smith" as the entity name and "person" as the entity type. The confidence level is a measurement of the degree of certainty that the person Mike Smith is the entity intended to be referred to by the words "Mike S." The entity name, type, and confidence level may be output from the entity extraction module to storage 128 and/or communicated to the user device 110 through the device interaction module 121 of the server 120.

The accuracy and usefulness of the entity extraction module 124 can be improved through reference to several types of input to the entity extraction module 124: a general training corpus 12401, general gazetteers 12402, user-specific gazetteers 12403, entity models 12404, and structured entity data

12405. First, an extensive general training corpus 12401 is used to train the machine learning module 1241 to recognize entities in the context of email, web pages, and other types of documents that are likely to be accessed on the user device 110. For example, a large collection of publicly available email messages and business documents may be used as a general training corpus 12401. In one embodiment, the general training corpus 12401 includes documents that have been reviewed by at least one human who identified entities within the documents in the training corpus 12401. These manually-labeled entities serve as ground cases for the machine learning module 1241.

General gazetteers 12402 may also serve as an input to the machine learning module 1241 to improve performance. A gazetteer is a dictionary that is used to enhance entity extraction. The general gazetteers 12402 may include lists of common person names along with weights reflective of the frequency the names occur in the population. In one embodiment, the presence of a particular string in this list of common names is a feature used by the machine learning module, in addition to other spelling and grammatical features, to build a model for extracting references to people. The general gazetteers 12402 may also include lists of places, lists of organizations, lists of words to ignore during the semantic analysis, and lists of context-specific words, such as those indicative of organization entities (e.g., "corporation", "incorporated", "LLC", etc.).

Figure 2C:
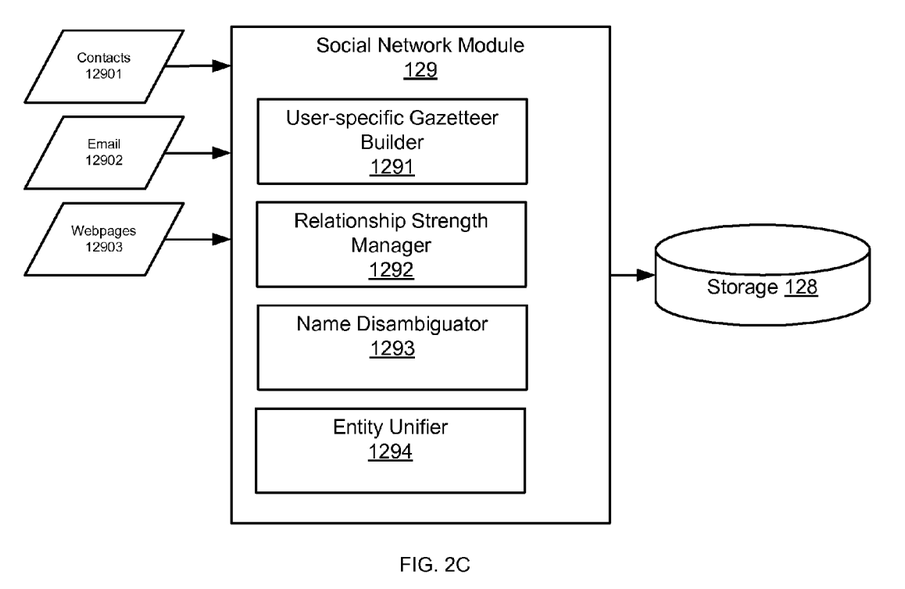
FIG. 2C is a block diagram of a social network module, in accordance with an embodiment of the invention.

In addition to these general gazetteers 12402, user-specific gazetteers 12403 may also be input into the entity extraction module 124 to improve entity extraction. A user-specific gazetteer 12403 is a dictionary containing words from the user's own data that is used to enhance entity extraction. In one embodiment, a gazetteer is created for each user containing names of people found in the user's list of contacts or in past emails to or from the user. This user-specific name gazetteer is used similarly to the common people names gazetteer described previously—the presence of a string in this list is a feature in the model for extracting references to people. User-specific gazetteers 12403 will be further described with respect to the social network module 129.

Entity models 12404 store properties associated with various recognized entities. For example, people entities may have associated names, aliases, addresses, phone numbers, and the like. An organization model may include company names, addresses and retail locations, the type of organization, and the like. Any time an entity is recognized in user data, the entity is stored in the entity model along with any extracted properties. Before entities are presented to the user, related properties are pulled from the appropriate entity model and associated with the entity. These properties from the model may then be used to facilitate actions for the user such as making a phone call, sending an email, or looking up an address on a map.

Structured entity data 12405 provides information about certain types of entities and known properties of those entities. This information is provided by an authoritative external source and can be used to improve recognition of those entity types and supply data needed for performing actions on those entities. In one embodiment, structured entity data includes a list of major organizations (including governments, corporations, and other organizations) with information such as alternate names, acronym expansion, subsidiary companies, official addresses and web sites, Wikipedia page URLs, stock exchange ticker symbols, and areas of industry. In this embodiment, extracted organization entities can be filtered through this list to provide more accurate recognition; properties from the structured data are then associated with the entities in the entity models 12404.

FIG. 2C illustrates a social network module, in accordance with one embodiment of the invention. The social network module 129 builds the social network model implicit in the user's data, such as from contacts 12901, email 12902, web pages 12903, as well as other types of documents. The social network model is a description of the relationships between the entities that are found in the user's data. The social network module 129 stores the social network model in storage 128. The social network module 129 includes a user-specific gazetteer builder 1291, a relationship strength manager 1292, a name disambiguator 1293, and an entity unifier 1294.

The user-specific gazetteer builder 1291 uses information from the user's own personal data to optimize the performance of the entity extraction module 124 for extracting entities from that personal data. This data may include the names and addresses of people from contacts 12901 stored by a contacts manager application of the user device 110 and email 12902 from an email application of the user device 110. In one embodiment, the user-specific gazetteer builder 1291 uses the pulled names and associated attributes to build a list of names found in the user's own social network. These names may be used to improve the extraction of person entities by helping the entity extraction module 124 to recognize references to these people, even if they have unusual names not found in a standard list of common person names and spelling, grammar, or other features are not sufficient for recognition. The user-specific gazetteer builder 1291 can output user-specific gazetteers 12403 to be stored in storage 128 for future use by the entity extraction module 124.

The relationship strength manager 1292 adjusts the strength of the relationships determined to exist between entities, particularly people entities. Whereas the entity extraction module 124 identifies the entities within the text analyzed, the relationship strength manager 1292 of the social network module 129 creates relationships between a user and another extracted entity, and between extracted entities determined to be in the same document, and adjusts the strength of relationship between the user and another entity or between entities according to the frequency they appear together. For example, a user may send and receive a lot of email from a person "Jane Smith." Thus, the relationship strength manager 1292 increases the strength of the relationship between the user and Jane Smith. As another example, in a recent email from "Jane Smith," she mentions another of the user's contacts, "John Black." Thus, the relationship strength manager 1292 creates a relationship between the entities "Jane Smith" and "John Black."

Other factors may also influence relationship strength beyond frequency of interaction. These factors include recency of interaction (e.g., measured from the timestamps associated with documents in which both entities in the relationship appear), direction of interaction (how often Jane Smith mentions John Black may differ from how often John Black mentions Jane Smith), types of interaction (for example, telephone calls versus emails, or telephone calls, text messages, and emails versus only emails), whether the entities are the sender or recipient of a message or on the "cc" line, the ratio between the number of messages to a person and the number of messages from a person, and the frequency and speed with which the user responds to messages from a person. In one embodiment, the number of messages the user receives from a person is compared to the number of messages the user sends to that person to compute the ratio of sent messages to received messages. When the ratio is near to 1 (i.e., the user and other person are equal contributors to the correspondence), the relationship may be considered strong. When that ratio is very low (i.e., the user receives many messages from someone whom he or she rarely contacts) or very high (i.e., the user often contacts someone who rarely responds), the relationship may be considered weaker, with the former case (a correspondent the user rarely contacts) being the weakest. These ratios may be computed for all relationships, adding directionality to the strength of relationship metric (i.e. the strength of relationship from Jane Smith to John Black may be different than that from John Black to Jane Smith). In one embodiment, the frequency and speed with which the user responds to messages from a person influences the strength of relationship with that person. For example, if the user responds to all of a person's messages, and does so within a few minutes, the relationship is considered strong. If the user rarely responds or takes days to do so, the relationship is considered weaker. Frequency and speed of response may be computed for all relationships, for each person in the relationship, adding directionality to the strength of relationship metric. When strength of relationship is directional, the overall strength of a relationship may be represented as a combination of the directional strength from a first entity to a second entity and the directional strength from the second entity to the first. Relationship strength may also be decayed over time, to reflect that a lack of recent communication between entities may indicate a decline in the strength of the relationship. In one embodiment, an exponential time decay is applied to the computation of relationship strength; the half-life of the decay may be varied to control how much weight the relationship strength manager 1292 gives to older interactions. The strength of the relationships between person entities can be output from the social network module 129 to be stored in storage 128 for use by the name disambiguator 1293.

The name disambiguator 1293 determines, from an ambiguous reference in the text analyzed by the entity extraction module 124, which entity is the entity intended to be referenced. The operation of the name disambiguator will be described in greater detail with reference to FIG. 5. Briefly, the name disambiguator receives an ambiguous reference that has been extracted by the entity extraction module 124. The name disambiguator 1293 generates a list of candidate entities that may be the true intended entity. The name disambiguator 1293 scores the list of candidates according to information provided by the social network module 129, in order to determine one or more best candidates for the true intended entity.

The entity unifier 1294 operates to determine whether two existing entities that have been extracted and stored in storage 128 should be combined into a single entity because they actually represent the same entity. The operation of the entity unifier 1294 helps ensure that an alias for an entity is appropriately cross-referenced so that new facts that are learned about the entity through the social network module 129 are accurately recorded. In one embodiment, entities are unified based on similarities in names and email addresses. Matching or similar names or addresses indicate the possibility that two entities refer to the same person; the degree of similarity indicates the confidence of the unification. Possible unifications below a certain threshold of confidence may not be performed until more evidence of similarity is found. More detail about name similarity is found in the discussion of FIG. 5. In one embodiment, the entity unifier 1294 periodically analyzes the social network model to identify candidate entities for unification, and performs entity unification between them.

Figure 3:
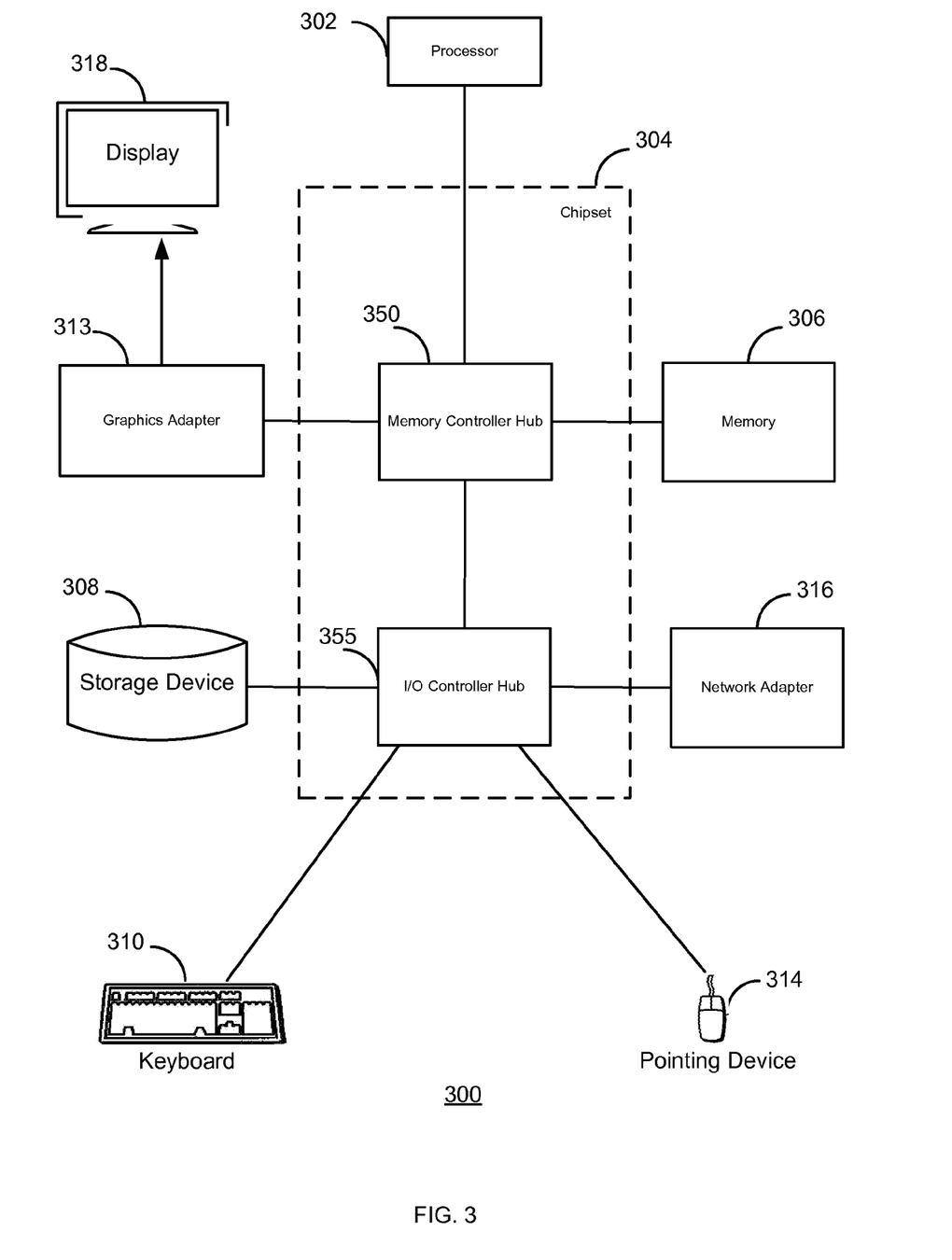
FIG. 3 is a high-level block diagram illustrating an example of a computer for use as a user device or server, in accordance with an embodiment of the invention.

FIG. 3 is high-level block diagram illustrating an example of a computer 300 for use as a server 120 or device 110, in accordance with an embodiment of the invention. Illustrated are at least one processor 302 coupled to a chipset 304. The chipset 304 includes a memory controller hub 350 and an input/output (I/O) controller hub 355. A memory 306 and a graphics adapter 313 are coupled to the memory controller hub 350, and a display device 318 is coupled to the graphics adapter 313. A storage device 308, keyboard 310, pointing device 314, and network adapter 316 are coupled to the I/O controller hub 355. Other embodiments of the computer 300 have different architectures. For example, the memory 306 is directly coupled to the processor 302 in some embodiments.

The storage device 308 is a computer-readable storage medium such as a hard drive, compact disk read-only memory (CD-ROM), DVD, or a solid-state memory device. The memory 306 holds instructions and data used by the processor 302. The pointing device 314 is a mouse, track ball, or other type of pointing device, and is used in combination with the keyboard 310 to input data into the computer system 300. The graphics adapter 313 displays images and other information on the display device 318. In some embodiments, the display device 318 includes a touch screen capability for receiving user input and selections. The network adapter 316 couples the computer system 300 to the communications network 101. Some embodiments of the computer 300 have different and/or other components than those shown in FIG. 3.

The computer 300 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 308, loaded into the memory 306, and executed by the processor 302.

The types of computers 300 used by the entities of FIG. 1 can vary depending upon the embodiment and the processing power used by the entity. For example, a mobile device 110 that is PDA typically has limited processing power, a small display 318, and might lack a pointing device 314. The server 120, in contrast, may comprise multiple blade servers working together to provide the functionality described herein.

Figure 4:
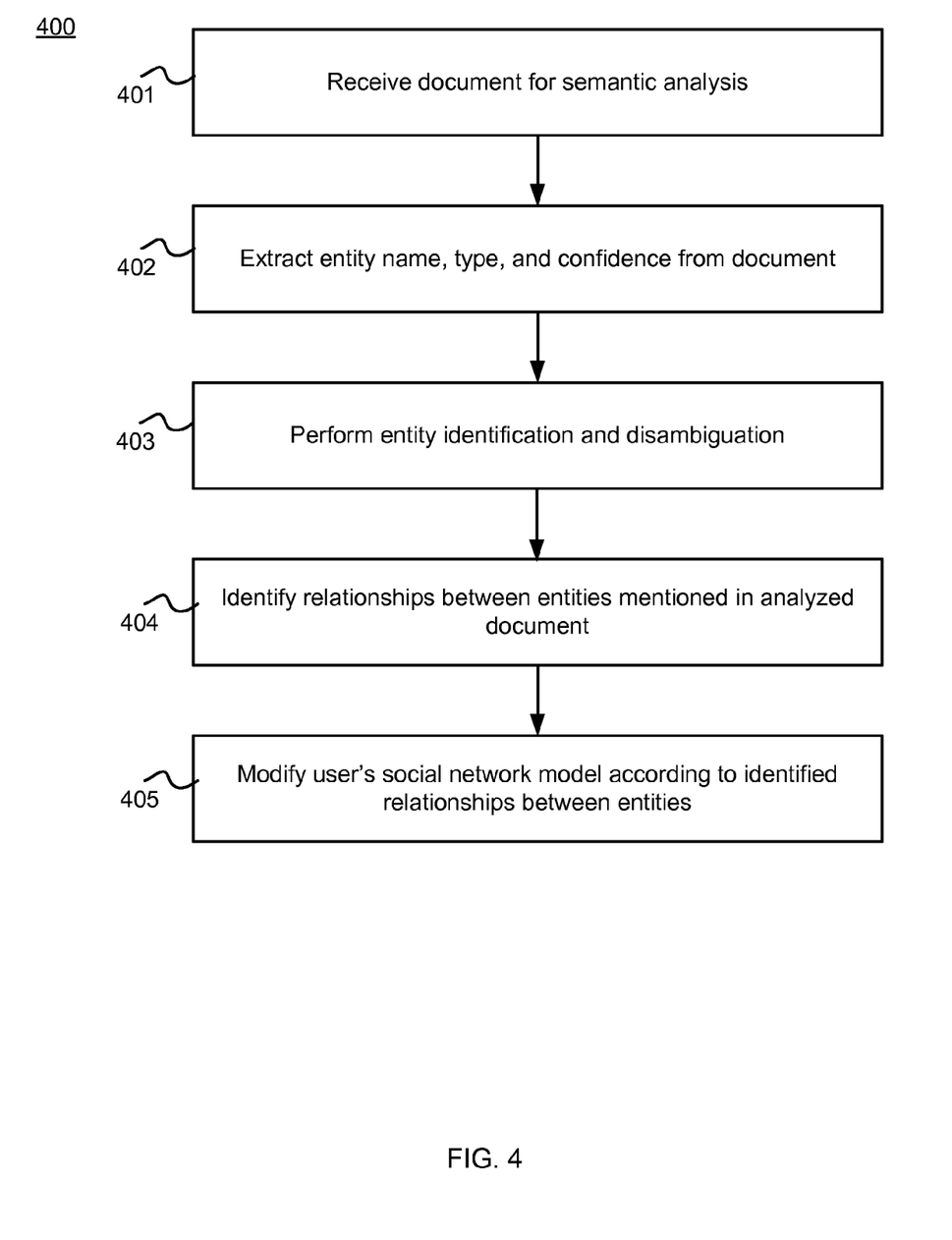
FIG. 4 is a flow chart illustrating a method of generating a social network model, in accordance with an embodiment of the invention.

FIG. 4 is a flow chart illustrating a method of generating a social network model, in accordance with an embodiment of the invention. In step 401, a document is received for semantic analysis. For example, the message agent 132 of the server 120 may receive an email from a message server 130 via the network 101, destined for a user device 110.

In step 402, at least one entity name, the type of entity, and a confidence level is extracted from the received document by using the entity extraction module 124 of the server 120. For example, the entity extraction module 124 may extract the name of a person referred to in the text of a received email, the type of entity (i.e., person), and a confidence level indicating a measurement of the certainty that the name of the person and the entity type is accurate. The entity extraction module 124 may also extract the sender of the email, as well as other recipients of the email.

In some cases, an extracted entity can be identified with some known entity in the user's world, such as a contact. In some cases, furthermore, there may be more than one possibility for the correct entity referred to by an alias in the received document, thus introducing some ambiguity. For example, a user may know a Mike Smith and a Mike Sims, either of which may be referred to as "Mike S." in an email.

Accordingly, optionally, in step 403, extracted entities are identified with known entities and, if necessary, entity disambiguation is performed, for example, by the name disambiguator 1293 of the social network module 129. A method of name disambiguation will be described in greater detail with reference to FIG. 5. Once one or more known entities are associated with the extracted entity, relevant facts about those entities are pulled from the entity models 12404. These facts are associated with the appropriate entities to be sent to the user device 110, so that they can be used by the user device 110 in actions relevant to the respective entities.

Optionally, in addition to performing name disambiguation 403, entity unification may also be performed, for example by entity unifier 1294 of the social network module 129. The entity unifier 1294 may compare the properties of what appears to be a new entity extracted from the received document with a similar entity already known in the social network model built by the social network module 129. A determination is made as to whether the new entity is similar enough to the existing entity that they should be merged because the two entities actually represent the same entity. For example, in one embodiment, certain properties, such as an email address, are presumed to be a unique identifier for an entity. Should two entities share the same email address, it is likely that they are actually the same entity having two different names or aliases. Other properties are not necessarily unique but provide strong evidence that two entities should be unified. For example, two entities with the same (or similar) first and last names are presumed to be the same entity with high (though not perfect) confidence. When entities are unified, the social network module 129 records the fact that they are linked without collapsing all information about those entities. Thus, the unification can be later undone if further data indicates it was a mistake. The operation of the entity unifier 1294 helps ensure that aliases for the same entity are cross-referenced so that new facts that are learned about the entity through the social network module 129 are accurately recorded.

In step 404, relationships between entities mentioned in the analyzed text are identified, for example, by the relationship strength manager 1293. For example, if an email to a user from a person entity "Jane Smith" is also addressed to a person entity "Ryan White," the relationship strength manager 1293 identifies a relationship between the entities Jane Smith and Ryan White.

In step 405, a user's social network model is modified according to the identified relationships between entities, for example, by the social network module 129. In the above example, if no identified relationship existed previously between Jane Smith and Ryan White, the social network module 129 creates a relationship between these person entities based on the email. If a relationship already existed between the person entities, the relationship strength manager 1293 may strengthen the relationship between the two entities to reflect the recent email correspondence. Thus, the user's social network model can be built and modified incrementally in response to analyzed text from a user's documents that reveals a relationship between entities.

Figure 5:
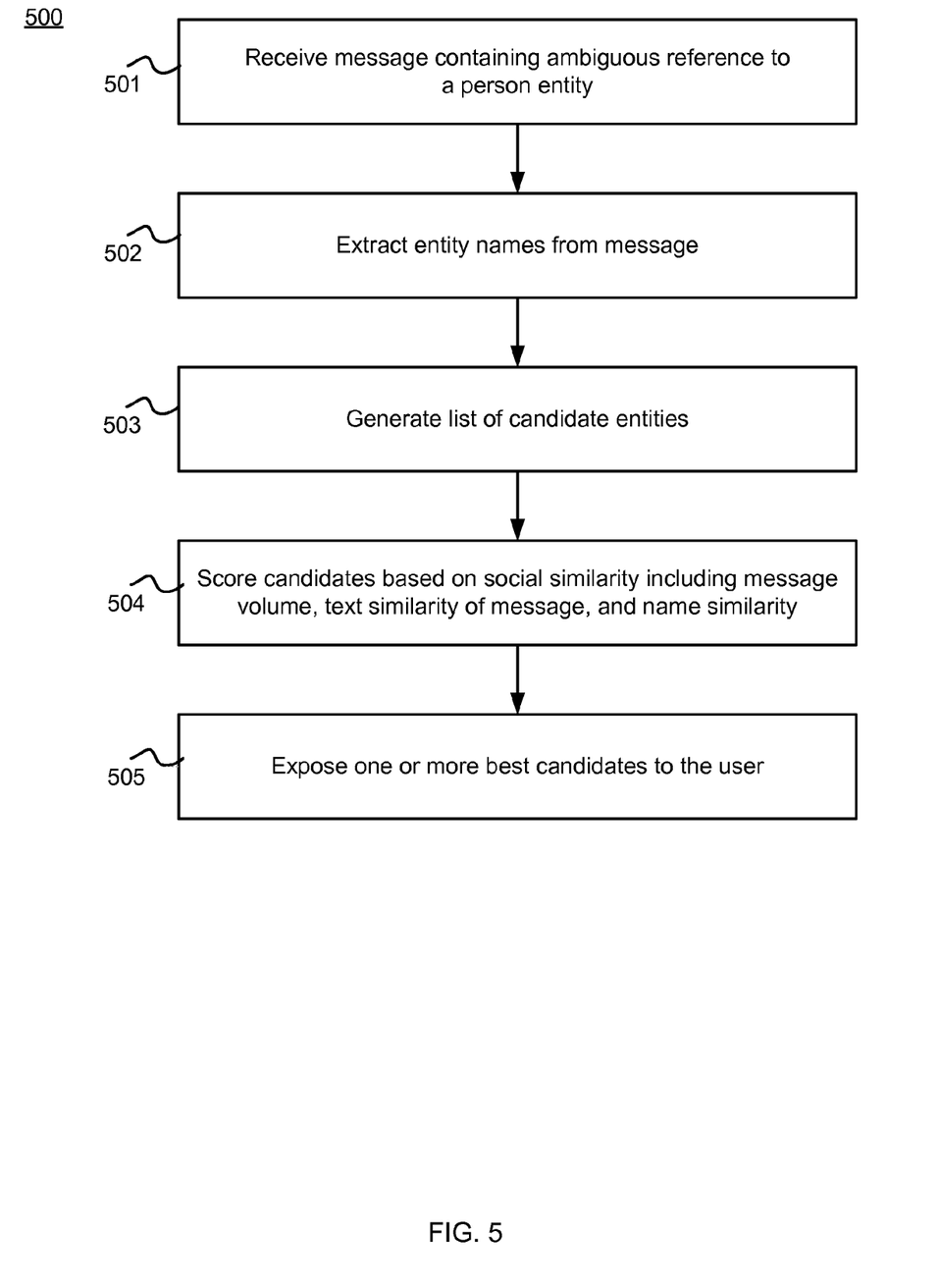
FIG. 5 is a flow chart illustrating a method of identifying an entity from an ambiguous reference in a message, in accordance with an embodiment of the invention.

FIG. 5 is a flow chart illustrating a method of identifying an entity from an ambiguous reference in a message, in accordance with an embodiment of the invention. In step 501, an ambiguous reference to a person entity is received in a message. For example, a user receives an email from Jane Smith that refers to a "Mike S." The user knows a "Mike Smith" and a "Mike Sims," either of which could be the true intended entity referred to as "Mike S."

In step 502, the entity names are extracted from the email text, for example, by entity extraction module 124. In this example, the entity name for the sender "Jane Smith" as well as the entity referred to as "Mike S." are extracted, along with any other entities referred to in any field of the email.

In step 503, a list of candidate entities is generated, for example, by the name disambiguator 1293 of the social network module 129. The candidate entities are the entities that may be the true intended entity based on a similarity to the extracted entity. To create the list of candidate entities, the name disambiguator 1293 draws from the pool of entities from the user's social network model with names in some way similar to that of the extracted entity. In one embodiment, these similarities include the same first name or last name, one name being a nickname of the other (as with "Mike" and "Michael"), one name including initials that match the other (as with "Mike S." and "Mike Smith" or "M.S." and "Mike Smith"), similar email names (as with "msmith@gmail.com" and "msmith@yahoo.com"), or a similarity between name and email name (as with mike@gmail.com and "Mike Smith"). In one embodiment, if no entities in the social network appear similar, the entity is assumed to be a stranger or public figure, and appropriate actions (such as searching a social network or news site) are presented to the user.

Assuming that a list of more than one candidate entities is generated in step 503, in step 504, the candidate entities are scored based on several factors to help determine which candidate entity is most likely to be the true intended entity referred to as "Mike S." In one embodiment, the factors include social similarity including message volume, text similarity of message, and name similarity.

Social similarity refers to the strength of the relationship between the sender and candidate entity. Based on patterns observed in interactions between people, it is more likely that the sender is referring to a candidate entity that is well known to her and that she often refers to, than to a candidate entity to/with whom she has never been observed referring nor interacting. As discussed above, the strength of the relationship between two entities is influenced by the volume of messages that is observed as flowing between them. In one embodiment, only the message volume from the sender of the email, i.e., Jane Smith, to each of the candidates is considered. In another embodiment, the message volume from each of the candidates to Jane Smith is also a factor. Generally, the higher the message volume between the sender and the candidate, the more likely the candidate is to be the true intended entity referred to as "Mike S." In the above example, if Jane Smith is found to have a much stronger relationship to Mike Smith than to Mike Sims, Mike Smith is considered the more likely disambiguation for "Mike S.".

Additionally, the similarity of the words in the text of the email to words in the text of other documents that referred to the candidate entities are analyzed, for example, by the text content analysis module 126 of the server 120. For example, consider an email from Jane Smith that refers to "boating" and the ambiguous reference of "Mike S" that may either refer to a "Mike Smith" or a "Mike Sims" based on the generated list of candidate entities. If other emails to or from Mike Sims or mentioning Mike Sims mention "boating" but no emails to or from Mike Smith or mentioning Mike Smith mention "boating," it is more likely that the true intended entity is Mike Sims. The text content analysis module 126 performs the comparison between text of the email with the ambiguous reference of "Mike S." to the text of other documents connected to the candidate entities to determine the text similarity as a factor to help determine which candidate entity is most likely to be the true intended entity referred to as "Mike S."

Also, the similarity between the ambiguous reference and the candidate entity names may also be a factor. In one embodiment, the name disambiguator 1293 considers a list of known aliases and nicknames introduced to the entity extraction module through general gazetteers 12402 or user-specific gazetteers 12403 developed by the user-specific gazetteer builder 1291 of the social network module 129. The higher the similarity between the ambiguous reference and the candidate entity name or known nickname or alias, the more likely the candidate is to be the true intended entity referred to by the ambiguous reference. For example, if a sender refers to a "Pat Smith" which may refer to a "Pat Smith," a "Patty Smith," or a "Patricia Smith" all of whom are separate people entities, it is more likely that the candidate "Pat Smith" is the true intended entity because of the higher similarity between the ambiguous reference and the candidate name "Pat Smith" as compared to the other candidates.

In one embodiment, a combination of these factors (i.e., social similarity including message volume, text similarity of message, and name similarity) is used to score the candidates. In one embodiment, the scores can be normalized by using weights for each of the factors. In one embodiment, social similarity receives the heaviest weight in the scoring of the candidates.

In step 505, one or more best candidates from the list of scored candidates are exposed to the user, for example, by transmitting them for display on the user device 110. In one embodiment, the scores are taken into account to determine how many candidates to expose to the user. If one candidate's score is clearly an outlier above the scores of the rest of the candidates, in one embodiment, only the one candidate's score is exposed. In one embodiment, only one candidate is exposed unless the user indicates that the candidate is wrong, in which case a second candidate is exposed. In one embodiment, it is user-configurable from the user device 110 to determine how many candidates to expose at a time. In one embodiment, all likely disambiguations may be exposed to the user, with the default and most prominent candidate being the one with the highest score.

The identification of the proper entity at the client device is particularly useful for building the social network model from the user's own data, and enabling the user to take subsequent action with respect to the identified entity. For example, as discussed above, in one embodiment, the graphical user interface 111 includes node menus that contain actions relevant to a selected entity and/or spinners which allow a user to simultaneously view a plurality of spinners, each spinner distinguished from one another by data type, context, parsing or sorting algorithms, or user interaction with the data. Both node menus and spinners have been described in U.S. patent application Ser. No. 12/512,854, filed Jul. 30, 2009, entitled "Data-Oriented User Interface for Mobile Device," which has been incorporated by reference in its entirety. In one embodiment, based on the entities communicated from the server 120, the user device 110 will determine possible actions to take with respect to the data, such as calling the entity, emailing the entity, visiting the entity's website, viewing calendar appointments with the entity, and/or other contextually appropriate actions given the data available to the user device 110. These actions may require data related to the relevant entity and stored as properties in the entity models 12404.

FIG. 5 has been described above with reference to identifying a person entity from an ambiguous reference in an email. Similar processes may be undertaken to identify a location entity or an organization entity from an ambiguous reference in an email, with adaptations that will be obvious to one of skill in the art based on the disclosure above related to person entities. For organization entities, the social network described above may be expanded to a general relationship network that includes organizations as entities in the network. Thus, the strength of the relationship between the user and organizations and between other persons and organizations may be computed in a similar manner to that between persons. The frequency with which a person mentions an organization (including mentioning or corresponding with people connected to the organization) may indicate the strength of that relationship. Person entities may be connected to an organization based on their address, job title, or email address, allowing the social network module to associate their data with the organization in general. Furthermore, the terms found in messages to, from, or mentioning an organization may be computed and compared to terms found in a message being analyzed. Finally, like person entities, organization entities may be compared using name similarity. These metrics can all be used to perform identification and disambiguation of organization entities.

With locations, similar analysis may be performed. Locations may be associated with people based on their addresses, locations they mention in messages, the locations of meetings they attend, or locations they choose to expose to others. Locations may also be associated with messages based on where the user was when the message was sent or received. As with people and organization entities, location entities may be identified and disambiguated based on similarity of names, similarity of terms in associated messages, or strength of relationship between people and locations.

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not described with reference to any particular programming language. It is appreciated that a variety of programming languages may be used to implement the teachings of the present invention as described herein, and any references to specific languages are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A computer-implemented method of generating a user's social network model, the method comprising:
   receiving a set of documents associated with a user;
   accessing the user's contact data, the contact data identifying a plurality of entities;
   analyzing the documents, using the contact data, to identify references to entities therein;
   identifying relationships among the referenced entities;
   determining a strength of a first relationship between a first entity and a second entity responsive to a volume of documents in which both the first entity and the second entity appear, wherein the first and second entities are a subset of the referenced entities;
   building a social network model for the user responsive to the identified relationships among the referenced entities and the strength of the first relationship;
   storing the social network model;
   receiving a new document associated with the user;
   identifying, in the new document, a reference to an ambiguous entity;
   performing name disambiguation using the social network model to determine which of
   at least two candidate entities from the social network model is an intended entity for the ambiguous entity;
   identifying other entities referenced by the new document; and
   updating the social network model by modifying relationship strengths in the social network model between the intended entity and the other entities referenced by the new document.

2. The method of claim 1, wherein the contact data is a contacts list.

3. The method of claim 1, wherein the referenced entities comprise people.

4. The method of claim 1, wherein identifying relationships among the referenced entities comprises identifying relationships among the referenced entities responsive to the referenced entities appearing in a same document.

5. The method of claim 1, wherein updating the social networking model comprises modifying a relationship strength between the intended entity and the one of the other identified entities based on a ratio between a number of messages from the intended entity to the one other identified entity and a number of messages from the one other identified entity to the intended entity.

6. The method of claim 1, wherein updating the social networking model comprises modifying a relationship strength between the intended entity and one of the other identified entities based on the frequency with which the intended entity responds to messages from the one other identified entity.

7. The method of claim 1, wherein updating the social networking model comprises modifying a relationship strength between the intended entity and one of the other identified entities based on an elapsed time before the intended entity responds to messages from the one other identified entity.

8. The method of claim 1, wherein the strength of the first relationship is determined from a combination of a directional strength from the first entity to the second entity and a directional strength from the second entity to the first entity.

9. The method of claim 1, wherein performing the name disambiguation comprises:
   generating, from the social network model, a list of the at least two candidate entities for the ambiguous entity, the candidate entities being entities from the user's social network model;
   scoring the candidate entities based at least in part on a strength of a relationship between a candidate entity and the user; and
   exposing one or more best scoring candidate entities to the user for selection.

10. The method of claim 9, wherein scoring the candidate entities is also based at least in part on a similarity between words in the new document to words in other documents connected to a candidate entity from the set of documents.

11. The method of claim 9, wherein scoring the candidate entities is also based at least in part on a similarity between the reference to the ambiguous entity and a candidate entity name.

12. The method of claim 1, further comprising performing entity unification between the intended entity and an entity in the user's social network model based on the modified relationship strengths.

13. The method of claim 1, further comprising performing entity unification between two entities in the user's social network model based on the modified relationship strengths.

14. The method of claim 1, wherein the other identified entities comprise organizations and people, the method further comprising:
adjusting a relationship strength between a person entity and an organization entity based on at least in part on a frequency of mentions of the organization in correspondence to or from the person.

15. The method of claim 1, wherein the other identified entities comprise locations and people, the method further comprising:
adjusting a relationship strength between a person entity and a location entity based at least in part on a frequency of mentions of the location in correspondence to or from the person.

16. A non-transitory computer-readable storage medium storing executable computer program instructions for updating a user's social network model, the computer program instructions comprising instructions for:
receiving a set of documents associated with a user;
accessing the user's contact data, the contact data identifying a plurality of entities;
analyzing the documents, using the contact data, to identify references to entities therein;
identifying relationships among the referenced entities;
determining a strength of a first relationship between a first entity and a second entity responsive to a volume of documents in which both the first entity and the second entity appear, wherein the first and second entities are a subset of the referenced entities;
building a social network model for the user responsive to the identified relationships among the referenced entities and the strength of the first relationship;
storing the social network model;
receiving a new document associated with the user;
identifying, in the new document, a reference to an ambiguous entity;
performing the name disambiguation using the social network model to determine which of the at least two candidate entities from the social network model is an intended entity for the ambiguous entity;
identifying other entities referenced by the new document; and
updating the social network model by modifying relationship strengths in the social network model between the intended entity and the other entities referenced by the new document.

17. The non-transitory computer-readable storage medium of claim 16, wherein the contact data is a contacts list.

18. The non-transitory computer-readable storage medium of claim 16, wherein the referenced entities comprise people.

19. The non-transitory computer-readable storage medium of claim 16, wherein identifying relationships among the referenced entities comprises identifying relationships among the referenced entities responsive to the referenced entities appearing in a same document.

20. The non-transitory computer-readable storage medium of claim 16, wherein updating the social networking model comprises modifying a relationship strength between the intended entity and one of the other identified entities based on a ratio between a number of messages from the intended entity to the one other identified entity and a number of messages from the one other identified entity to the intended entity.

21. The non-transitory computer-readable storage medium of claim 16, wherein updating the social networking model comprises modifying a relationship strength between the intended entity and one of the other identified entities based on the frequency with which the intended entity responds to messages from the one other identified entity.

22. The non-transitory computer-readable storage medium of claim 16 wherein updating the social networking model comprises modifying a relationship strength between the intended entity and one of the other identified entities based on an elapsed time before the intended entity responds to messages from the one other identified entity.

23. The non-transitory computer-readable storage medium of claim 16, wherein the strength of the first relationship is determined from a combination of a directional strength from the first entity to the second entity and a directional strength from the second entity to the first entity.

24. The non-transitory computer-readable storage medium of claim 16, wherein the computer program instructions further comprise instructions for:
generating, from the social network model, a list of the at least two candidate entities for the ambiguous entity, the candidate entities being entities from the user's social network model;
scoring the candidate entities based at least in part on a strength of a relationship between a candidate entity and the user; and
exposing one or more best scoring candidate entities to the user for selection.

25. The non-transitory computer-readable storage medium of claim 24, wherein scoring the candidate entities is also based at least in part on a similarity between words in the new document to words in other documents connected to a candidate entity from the set of documents.

26. The non-transitory computer-readable storage medium of claim 24, wherein scoring the candidate entities is also based at least in part on a similarity between the reference to the ambiguous entity and a candidate entity name.

27. The non-transitory computer-readable storage medium of claim 16, wherein the computer program instructions further comprise instructions for performing entity unification between the intended entity and an entity in the user's social network model based on the modified relationship strengths.

28. The non-transitory computer-readable storage medium of claim 16, wherein the computer program instructions further comprise instructions for performing entity unification between two entities in the user's social network model based on the modified relationship strengths.

29. The non-transitory computer-readable storage medium of claim 16, wherein the other identified entities comprise organizations and people, and wherein the computer program instructions further comprise instructions for:
adjusting a relationship strength between a person entity and an organization entity based at least in part on a frequency of mentions of the organization in correspondence to or from the person.

30. The non-transitory computer-readable storage medium of claim 16, wherein the other identified entities comprise locations and people, and wherein the computer program instructions further comprise instructions for:
adjusting a relationship strength between a person entity and a location entity based at least in part on a frequency of mentions of the location in correspondence to or from the person.

31. A system for updating a user's social network model, the system comprising:
a processor; and a non-transitory computer-readable storage medium storing computer program instructions executable by the processor, the computer program instructions comprising instructions for:

receiving a set of documents associated with a user;

accessing the user's contact data, the contact data identifying a plurality of entities;

analyzing the documents, using the contact data, to identify references to entities therein:

identifying relationships among the referenced entities;

determining a strength of a first relationship between a first entity and a second entity responsive to a volume of documents in which both the first entity and the second entity appear, wherein the first and second entities are a subset of the referenced entities;

building a social network model for the user responsive to the identified relationships among the referenced entities and the strength of the first relationship;

storing the social network model;

receiving a new document associated with the user;

identifying, in the new document, a reference to an ambiguous entity;

performing name disambiguation using the social network model to determine which of at least two candidate entities from the social network model is an intended entity for the ambiguous entity;

identifying other entities referenced by the new document; and updating the social network model by modifying relationship strengths in the social network model between the intended entity and the other entities referenced by the new document.

* * * * *